United States Patent
Lamar (10) Patent No.: US 8,815,203 B2
(45) Date of Patent: Aug. 26, 2014

(54) COLD BED ADSORPTION SULFUR RECOVERY PROCESS

(71) Applicant: Black & Veatch Corporation, Overland Park, KS (US)

(72) Inventor: Justin A. Lamar, Olathe, KS (US)

(73) Assignee: Black & Veatch Holding Company, Overland Park, KS (US)

( * ) Notice: Subject to any disclaimer, the term of this patent is extended or adjusted under 35 U.S.C. 154(b) by 0 days.

(21) Appl. No.: 13/864,891

(22) Filed: Apr. 17, 2013

(65) Prior Publication Data

US 2014/0044631 A1  Feb. 13, 2014

Related U.S. Application Data

(60) Provisional application No. 61/681,011, filed on Aug. 8, 2012.

(51) Int. Cl.
  *C01B 17/04* (2006.01)

(52) U.S. Cl.
  USPC .................................................... 423/574.1

(58) Field of Classification Search
  CPC   C01B 17/04; C01B 17/0404; C01B 17/0426; C01B 17/0439; B01D 53/8603; B01D 53/8615
  USPC .......................... 423/574.1; 422/168–171, 187
  See application file for complete search history.

(56) References Cited

U.S. PATENT DOCUMENTS

| | | | |
|---|---|---|---|
| 4,482,532 A * | 11/1984 | Cabanaw | 423/574.1 |
| 4,601,330 A * | 7/1986 | Palm et al. | 165/95 |
| 5,015,459 A | 5/1991 | Pendergraft | |
| 5,015,460 A | 5/1991 | Pendergraft | |
| 5,141,733 A * | 8/1992 | Pendergraft | 423/574.1 |
| 7,357,908 B2 | 4/2008 | Ramani et al. | |
| 2008/0050306 A1 | 2/2008 | Keller et al. | |
| 2009/0220402 A1 | 9/2009 | Keller et al. | |
| 2011/0268650 A1 | 11/2011 | Lamar | |

OTHER PUBLICATIONS

The International Search Report and Written Opinion dated Jul. 5, 2013 in the corresponding PCT/US2013/036978 filed Apr. 17, 2013.

* cited by examiner

*Primary Examiner* — Timothy Vanoy
(74) *Attorney, Agent, or Firm* — Hovey Williams LLP (57) ABSTRACT

A process for removing sulfur from a gas stream is provided in which a plurality of reactor units, each comprising a condenser and reactor, are selectively operable under Claus reaction and cold bed adsorption conditions. The arrangement of reactor units within the plant is periodically changed following a front-middle-back sequencing scheme. This ensures that the final reactor unit in the series utilizes fully cooled catalyst which is most efficient for operation under cold bed adsorption conditions. In addition, the condenser of the final reactor unit in the series operates at or below the freezing point of sulfur thereby permitting even greater sulfur recovery.

17 Claims, 6 Drawing Sheets

COLD BED ADSORPTION SULFUR RECOVERY PROCESS

RELATED APPLICATION

This application claims the benefit of U.S. Provisional Patent Application No. 61/681,011, filed Aug. 8, 2012.

BACKGROUND OF THE INVENTION

1. Field of the Invention

A sulfur recovery plant is provided comprising a primary Claus reactor and a plurality of downstream reactor units, each reactor unit comprises a reactor that is selectively operable under Claus reaction conditions and cold bed adsorption (CBA) reaction conditions thereby permitting the plant to achieve greater than 99.5% average sulfur removal efficiency. The high sulfur removal efficiencies are obtained through sequencing the reactor units such that the reactor unit containing the coolest catalyst is positioned in the final spot in the series of reactor units. The order of reactor units within the sequence is periodically changed so as to permit catalyst regeneration. However, the reactor unit containing the newly regenerated catalyst is shifted to a middle position, as opposed to the final position in the sequence of reactor units. This manner of shifting the order of reactor units within the plant provides additional cooling time for the catalyst that has been most recently regenerated thereby ensuring that the final reactor unit in the series is capable of highly efficient cold bed adsorption operation.

2. Description of the Prior Art

The processing of natural gas or petroleum products often results in the generation of acid gas streams comprising oftentimes significant quantities of sulfur, generally in the form of $H_2S$. These acid gas streams are often of limited value and are commonly disposed of by incineration. However, environmental regulations restrict the amount of sulfur that can be released into the atmosphere. Therefore, a significant portion of the sulfur present in these waste product streams must be removed prior to incineration.

One approach to the removal of sulfur has been through the use of an extended Claus sulfur recovery plant, such as that disclosed in U.S. Pat. Nos. 5,015,459 and 5,015,460. In these plants, one catalytic reactor is operated under high temperature Claus conditions in series with one or more catalytic reactors each periodically operated under high temperature Claus and cold bed adsorption (CBA) conditions. Each catalytic reactor that alternates between Claus conditions and CBA conditions is associated with a sulfur condenser to comprise a reactor unit. The sequencing of the reactor units is periodically changed so that the reactor having freshly-regenerated catalyst is placed in the last position in the sequence.

The CBA plants have demonstrated average sulfur removal efficiencies of up to 99.2%. However, as environmental regulations become even more strict, CBA plants such as those described in the aforementioned patents have not thus far been able to achieve 99.5% or greater average sulfur reduction efficiencies. In order to achieve this level of efficiency, conventional CBA plants would need to be equipped with an additional tail gas treating unit, such as a hydrogenation/amine treating unit, thereby adding further capital and operating expense. Thus, it would be highly desirable if a CBA plant could be configured to achieve 99.5% or greater average sulfur removal efficiency without the need for additional tail gas treatment.

SUMMARY OF THE INVENTION

One embodiment according to the present invention comprises a process for recovering sulfur from a gas stream. A process gas comprising $H_2S$ and $SO_2$ is passed through a primary Claus reactor operable to convert at least a portion of the $H_2S$ and $SO_2$ present in the process gas into elemental sulfur. Next, the gas exiting the primary Claus reactor is passed sequentially through at least first, second, and third reactor units, each reactor unit comprising a catalytic reactor and a sulfur condenser. The catalytic reactors are capable of selective operation under both Claus reaction conditions and cold bed adsorption conditions. After a First period of operation of the reactor units, the sequence of the reactor units is rearranged such that the gas exiting the primary Claus reactor first passes through the third reactor unit, followed by the first and second reactor units.

Another embodiment according to the present invention comprises a process for recovering sulfur from a gas stream. A process gas comprising $H_2S$ and $SO_2$ is passed through a primary Claus reactor operable to convert at least a portion of the $H_2S$ and $SO_2$ present in the process gas into elemental sulfur. Next, the gas exiting the primary Claus reactor is passed sequentially through a series of reactor units, each reactor unit comprising a catalytic reactor and a sulfur condenser. The condenser of the final reactor unit in the series is operated so that the gas exiting the condenser is at or below the freezing point of sulfur.

Still another embodiment according to the present invention comprises a process for recovering sulfur from a gas stream. A process gas comprising $H_2S$ and $SO_2$ is passed through a primary Claus reactor operable to convert at least a portion of the $H_2S$ and $SO_2$ present in the process gas into elemental sulfur. Next, the gas exiting the primary Claus reactor is passed sequentially through a series of reactor units, each reactor unit comprising a catalytic reactor and a sulfur condenser. The catalytic reactor of the final reactor unit in the series has an inlet temperature that is within 10° F. of the freezing point of sulfur.

A further embodiment according to the present invention comprises a sulfur recovery unit. The sulfur recovery unit includes a primary Claus reactor and a series of reactor units located downstream from the primary Claus reactor. The primary Claus reactor is configured to receive a process gas comprising $H_2S$ and $SO_2$ and convert at least a portion of the $H_2S$ and $SO_2$ into elemental sulfur. Each of the downstream reactor units comprises a sulfur condenser and a catalytic reactor. The catalytic reactor of the final reactor unit in the series operates at the lowest average temperature of all of the catalytic reactors in the series.

Still a further embodiment according to the present invention comprises a sulfur recovery unit. The sulfur recovery unit includes a primary Claus reactor and a series of reactor units located downstream from the primary Claus reactor. The primary Claus reactor is configured to receive a process gas comprising $H_2S$ and $SO_2$ and convert at least a portion of the $H_2S$ and $SO_2$ into elemental sulfur. Each of the downstream reactor units comprises a sulfur condenser and a catalytic reactor. The condenser of the final reactor unit in the series operates at a temperature that is at or below the freezing point of sulfur.

DETAILED DESCRIPTION OF THE PREFERRED EMBODIMENT

Turning to the Figures, an exemplary sulfur removal plant 10 is represented schematically. It is noted that each figure contains both solid and dashed process lines. The solid lines indicate conduit through which process gas is flowing and the dashed lines indicating conduit that is presently closed off by valves. Plant 10 comprises a primary Claus reactor 12 configured to receive a process gas stream via conduit 14. The process gas stream may comprise the products of a thermal reaction step in which oxygen is introduced into byproducts from natural gas or petroleum processing, such as an acid gas stream, and combusted in, for example, a thermal reactor. The products of this thermal reaction step carried by conduit 14 comprise a sulfur compound, such as $H_2S$, and one or more other components, such as $CO_2$ and water. Reactor 12 contains a Claus catalyst such as activated $Al_2O_3$ or $TiO_2$ that catalytically converts $H_2S$ and $SO_2$ (produced by combustion of $H_2S$ within the reactor) into elemental sulfur. However, conversion of $H_2S$ to elemental sulfur in reactor 12 is often not as complete as many environmental regulations require. Therefore, additional reaction must be carried out.

Figure 1:
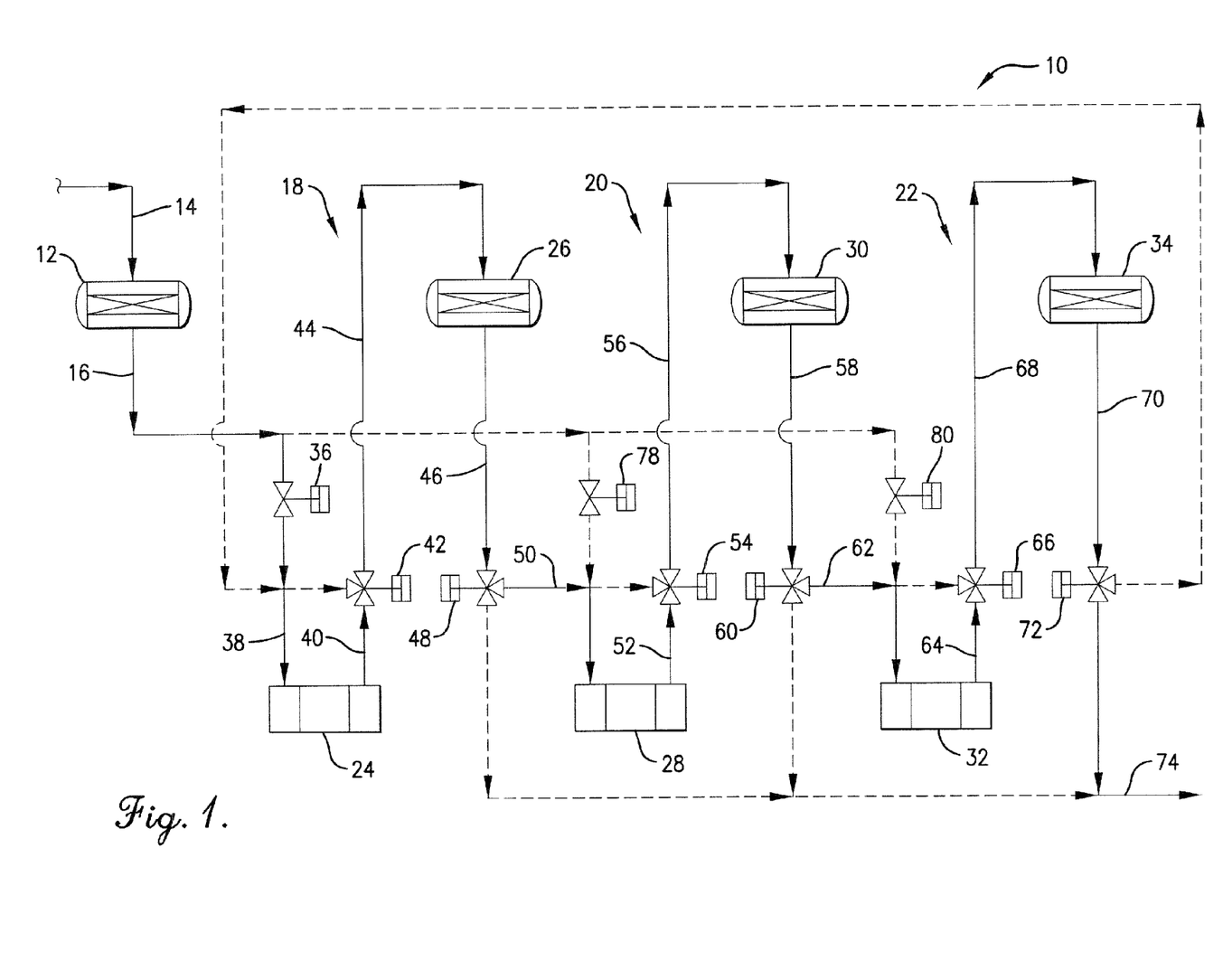
FIG. 1 is a process flow diagram of a sulfur removal plant in which process gas exiting a primary Claus reactor is directed through a series of cold bed adsorption reactor units, the process gas first flowing through a condenser of the first unit prior to being directed through the reactor of the first unit.

The reacted process gas stream exits reactor 12 through conduit 16 and is directed toward a plurality of reactor units, depicted in FIG. 1 as units 18, 20, and 22, for further $H_2S$ conversion. As discussed in greater detail below, the sequencing of the reactor units is variable so as to optimize average sulfur removal efficiency to a level of at least 99.5% for the cycle. In particular, a "front-middle-back" sequence for rotation of reactor units 18, 20, 22 is employed. Each reactor unit comprises a sulfur condenser 24, 28, 32, and a reactor 26, 30, 34, respectively. The reactor units themselves are of similar function, as each will be cycled through the various operational positions within plant 10.

In certain embodiments, condensers 24, 28, 32 are located upstream from respective reactors 26, 30, 34 and comprise tube/shell heat exchangers employing, for example, water on the shell side as the cooling fluid for condensing the sulfur. The liquified sulfur is then recovered from the condensers. Reactors 26, 30, 34 are catalytic reactors containing similar Claus catalyst as primary reactor 12. But unlike reactor 12, reactors 26, 30, 34 selectively operate under both Claus reaction conditions and cold bed adsorption conditions. Under Claus reaction conditions, sulfur formed in the presence of the Claus catalyst is continuously removed from the reactor in the vapor phase due to the relatively high temperatures associated with the reaction. Under cold bed adsorption conditions, the sulfur formed is deposited and accumulated on the Claus catalyst, which must be regenerated from time to time. However, under both sets of conditions, the reactors catalyze the Claus reaction in which $H_2S$ and $SO_2$ are converted to elemental sulfur.

As depicted in FIG. 1, the stream carried by conduit 16 is initially directed toward reactor unit 18. Specifically, the process gas in conduit 16 is directed through a control valve 36 and into condenser 24 via conduit 38. Within condenser 24 at least a portion of the sulfur generated by primary Claus reactor 12 is condensed and recovered from plant 10. The process gas exits condenser 24 at about 260° F. via conduit 40 and passes through three-way valve 42. The process gas is then directed toward reactor 26 via conduit 44. In reactor 26, additional $H_2S$ is reacted to form elemental sulfur. The process gas exits reactor 26 via conduit 46 and is directed toward reactor unit 20.

Three-way valve 48 is positioned to direct the process gas into conduit 50 and eventually through sulfur condenser 28. The process gas exits sulfur condenser 28 via conduit 52 at about 260° F. A three-way valve 54 directs the process gas toward reactor 30 via conduit 56. Upon exiting reactor 30, the process gas is directed toward reactor unit 22 via conduit 58. Three-way valve 60 is positioned to direct the process gas into conduit 62 and eventually through sulfur condenser 32.

Sulfur condenser 32 is operated at the lowest temperature of each of the three condensers in the process scheme depicted in FIG. 1. In certain embodiments, the temperature of the process gas exiting condenser 32 is at or below the freezing point of sulfur, approximately 240° F. or less. The cooler temperatures in condenser 32 can be achieved by depressurizing the shell side of the condenser (in certain embodiments to about 9 to 10 psig) so as to lower the temperature of the steam exiting the condenser. When plant 10 is operated in this configuration, the steam pressure for condenser 32 is less than that of condensers 24 and 28. In other embodiments, a liquid comprising a heat transfer fluid may be used in place of steam to provide the necessary cooling for the condensers used herein. The temperature and flow of the liquid may be adjusted to provide the desired operational temperature for the condenser and outlet temperature for the process gas.

Operating a condenser at such low temperatures generally defies conventional wisdom regarding Claus plant operation, as this will result in the accumulation of solidified sulfur in the tubes of condenser 32, especially in the tubes adjacent the condenser outlet. However, the condensers utilized in this process are generally designed to accommodate high cooling duty demands. Therefore, when a reactor unit is located in the third position, as is reactor unit 22 in the configuration of FIG. 1, its condenser possesses sufficient surface area to make up for loss of operating efficiency resulting from the solidification of sulfur within its tubes. Thus, accumulation of sulfur in the tubes for the period in which reactor unit 22 operates in the final position in the sequence of reactor units of plant 10 will not meaningfully affect the overall performance of the condenser.

The process gas stream exits condenser 32 via conduit 64 and is directed through three-way valve 66 and toward reactor 34 via conduit 68. The much lower temperature of the process stream exiting condenser 64 also permits reactor 34 to operate at a much cooler temperature than reactors 28 and 30. This lower operational temperature provides more efficient H$_2$S conversion under cold bed adsorption conditions. In certain embodiments, reactor 34, the final reactor in the series, has an inlet temperature that is within 10° F. of the freezing point of sulfur (e.g., between about 230° F. to about 250° F.), or even within 5° F. of the freezing point of sulfur (e.g., between about 235° F. to about 245° F.). The process gas exiting reactor 34 through conduit 70 can be directed by three-way valve 72 to conduit 74, which feeds, for example, an incinerator or a tail gas treatment unit. Although, it is an advantage with certain embodiments of the present invention that further tail gas treatment can be avoided because the increased efficiency of plant 10 results in a sufficiently low sulfur content gas stream which would permit incineration without a need for further sulfur removal.

Figure 2:
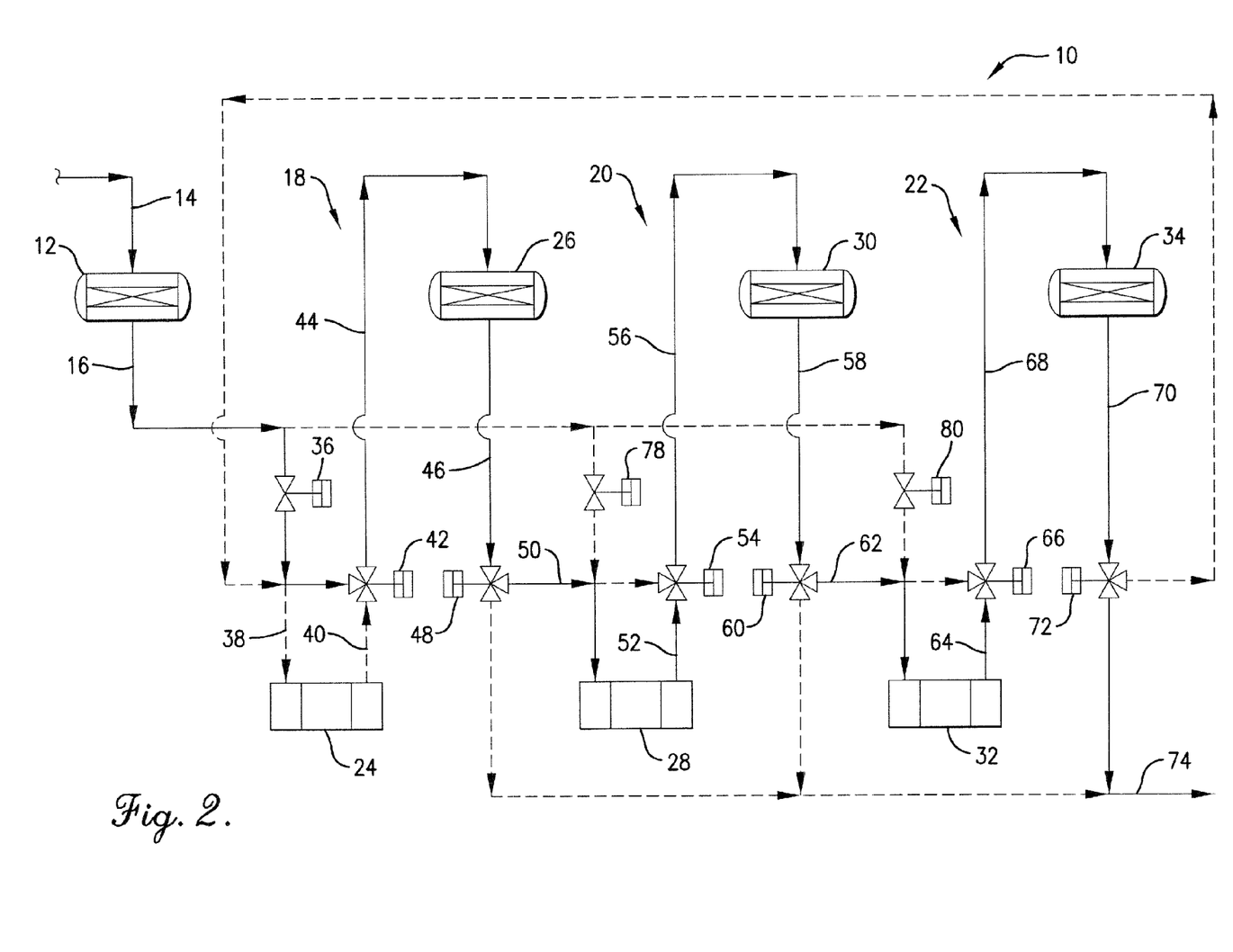
FIG. 2 is a process flow diagram of a sulfur removal plant as depicted in FIG. 1, except that the process gas exiting the primary Claus reactor bypasses the condenser of the first unit and is directed immediately to the reactor of the first unit.

After operation of plant 10 in the configuration of FIG. 1 for a predetermined period of time, in some embodiments approximately 3 hours, the flow path of process gas through plant 10 is slightly altered so as to liberate sulfur that has been deposited on the catalyst present in reactor 26. Turning to FIG. 2, it can be seen that the position of valve 42 has been altered so that the process gas from conduit 16 now bypasses condenser 24 via conduit 76 and flows through valve 42 and directly into reactor 26. The increased temperature of the process gas being introduced into reactor 26 vaporizes sulfur which may have accumulated on the catalyst inside reactor 26 thereby regenerating the catalyst. The remainder of plant 10 operates as described above for FIG. 1. In certain embodiments, plant 10 is operated in this configuration for approximately 9 hours, at which time the flow path of process gas through plant 10 is again altered.

In preparation for a re-sequencing of reactor units, the flow path of process gas through plant 10 is changed from the configuration of FIG. 2 back to the configuration of FIG. 1. Essentially, this involves bringing condenser 24 back on-line so as to cool the process gas being directed toward reactor 26. Thus, the catalyst within reactor 26 is pre-cooled in advance of the re-sequencing of reactor units. The remainder of plant 10 continues to operate as previously described for FIG. 1. In certain embodiments, plant 10 is operated in this configuration for approximately 3 hours.

Figure 3:
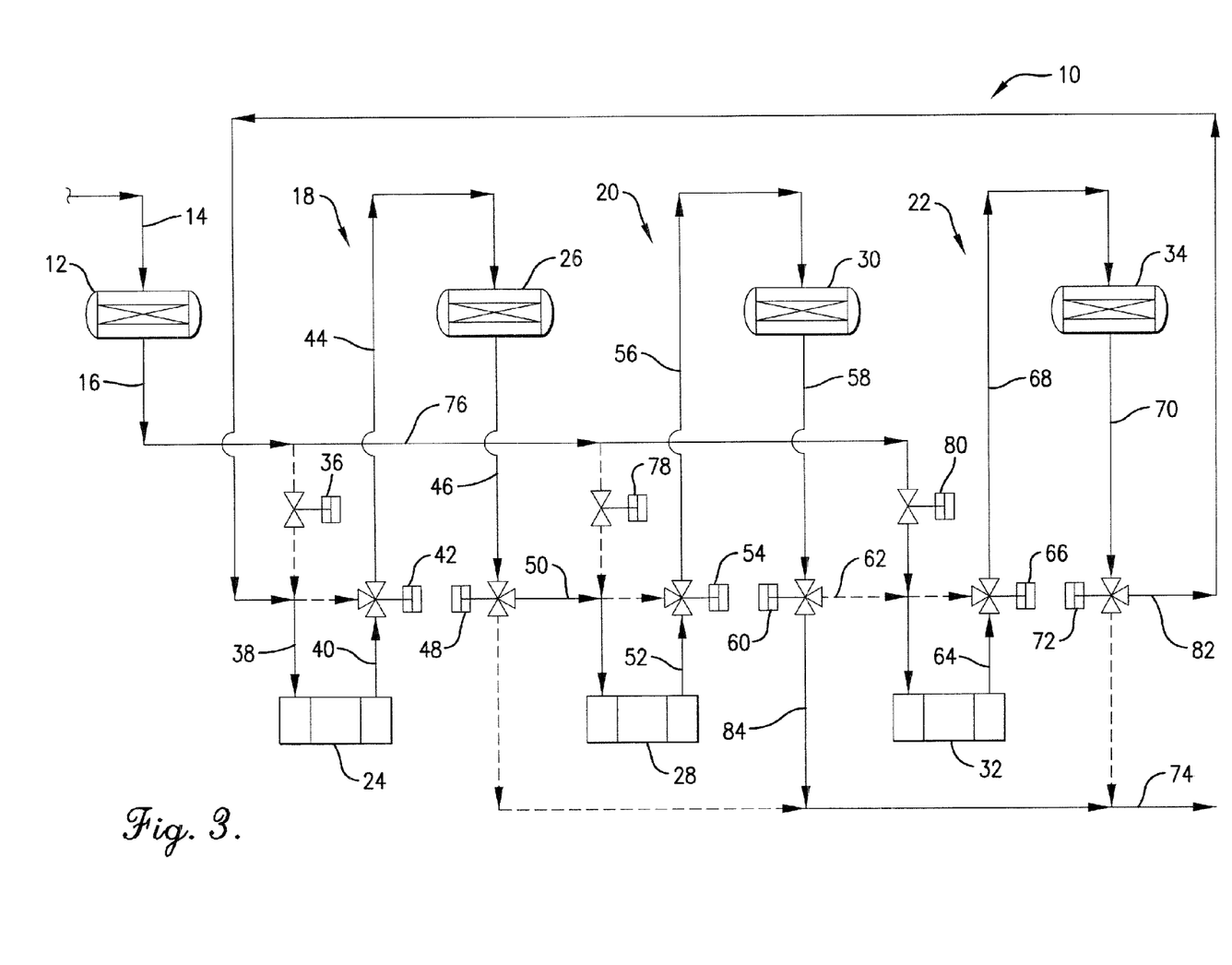
FIG. 3 is a process flow diagram of a sulfur removal plant in which process gas exiting the primary Claus reactor is initially directed toward a third CBA reactor unit, and particularly through the condenser of the third unit prior to being directed through the reactor of the third unit, and wherein the second reactor unit from FIGS. 1 and 2 is now in the final position in the series of reactor units.

Next, the sequencing of reactor units is changed so as to permit regeneration of catalyst in reactor 30 of reactor unit 20. Conventionally, reactor unit 18, having the "freshest" catalyst (i.e., having most recently undergone regeneration) would be slotted in the final position of the sequence of reactor units. However, it has been discovered that the sulfur removal efficiency of plant 10 can be improved if reactor unit 18 is not moved to the final position in the sequence of reactor units, but rather a middle position, namely the second position as shown in FIG. 3. Because reactor 26 has not be operated (for the second time) in the configuration of FIG. 1 for long, the catalyst contained within reactor 26 is much warmer than the catalyst contained, for instance, in reactor 30. Thus, the catalyst in reactor 26 will not perform as effectively as the catalyst in reactor 30 under cold bed adsorption conditions. Therefore, even though the catalyst contained within reactor 30 may contain more adsorbed sulfur, it has been discovered that its lower temperature renders it more effective under cold bed adsorption conditions than the catalyst in reactor 26.

In the plant configuration depicted in FIG. 3, valve 36 is closed thus diverting the flow of process gas from conduit 16 into conduit 76. A valve 78 in reactor unit 20 also remains closed so that the process gas continues to flow toward reactor unit 22, while a valve 80 has been opened. Thus, reactor unit 22 has assumed the first position in the sequencing of reactor units downstream of primary Claus reactor 12. Process gas is directed through valve 80 and flows through sulfur condenser 32. Sulfur condenser 32 is no longer operated to produce an outlet temperature at or below the freezing point of sulfur. The shell side steam pressure is now increased to 15 psig, for example, thereby increasing the outlet temperature of condenser 32. Also, condenser 32 is receiving the hot process gas directly from primary Claus reactor 12. Therefore, any sulfur that may have solidified in the tubes of condenser 32 from the immediately preceding operating configurations is at least melted. In certain embodiments, the process gas exiting condenser 32 via conduit 64 has a temperature of about 260° F. The process gas passes through three-way valve 66 and into conduit 68 where it is directed to reactor 34. Three-way valve 72 has been repositioned so that the process gas exiting reactor 34 and carried by conduit 70 is diverted to conduit 82 and directed toward reactor unit 18, which has been moved to the second position in the sequence of reactor units.

The process gas carried by conduit 82 is transferred to conduit 38 (due to the position of valve 42) and passed through condenser 24. In certain embodiments, the process gas exiting condenser 24 has a temperature of about 260° F. The process gas is then directed through reactor 26 and toward reactor unit 20 as previously described above. However, because reactor unit 20 is now in the final position in the sequence of reactor units, condenser 28 is operated at or below the freezing point of sulfur, much like condenser 32 was operated when in the configuration shown in FIG. 1. Likewise, in certain embodiments, the inlet to reactor 30 is within 10° F. of the freezing point of sulfur. Upon exiting reactor 30, the process gas is carried by conduit 58 to three-way valve 60. Valve 60 is positioned so as to divert the process gas into conduit 84 and then to conduit 74 to be finally disposed of.

Figure 4:
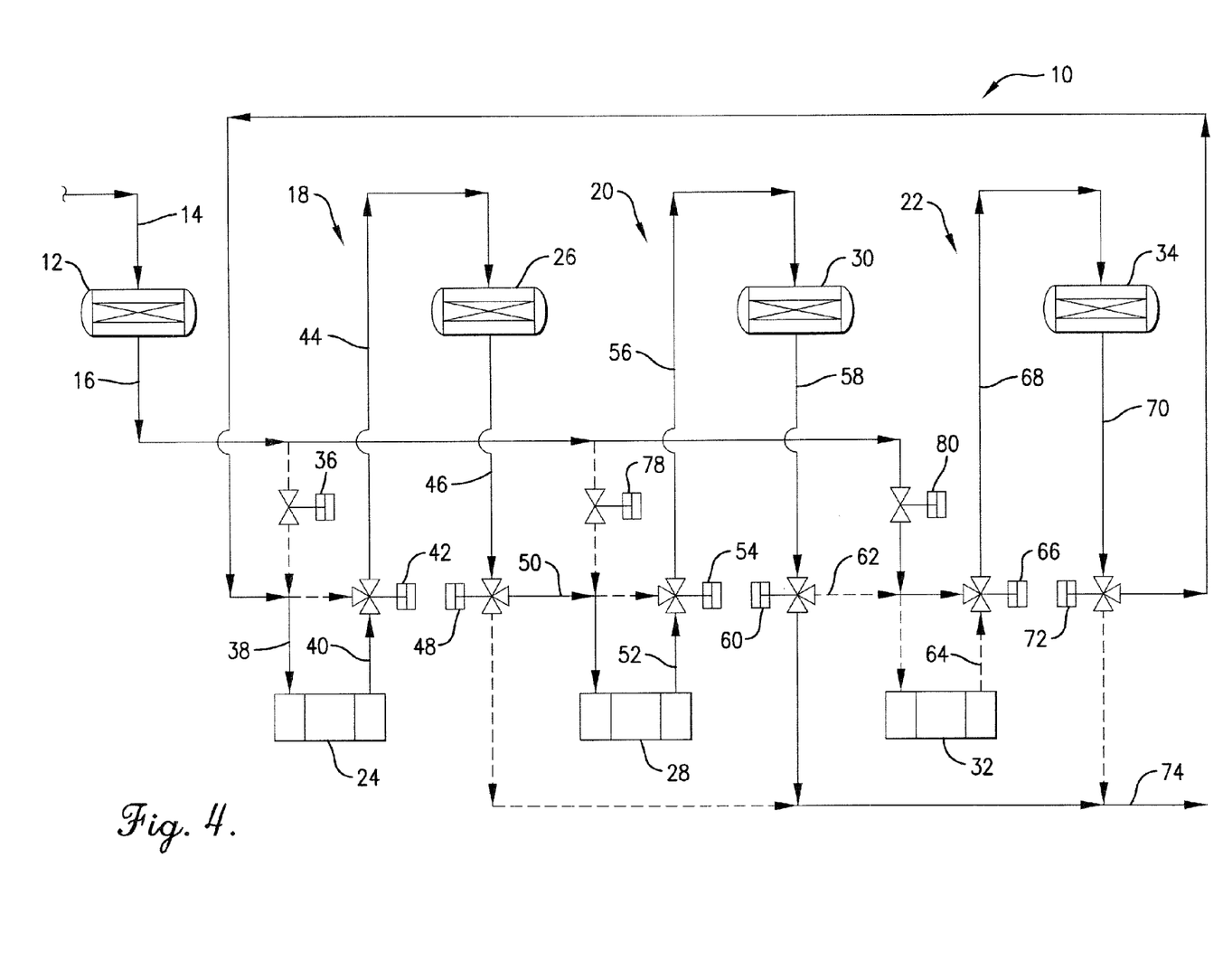
FIG. 4 is a process flow diagram of a sulfur removal plant as depicted in FIG. 2, except that the process gas exiting the primary Claus reactor bypasses the condenser of the third unit and is directed immediately to the reactor of the third unit.

After a period of operation in the configuration shown in FIG. 3, approximately three hours in certain embodiments, the gas flow path is slightly altered so that condenser 32 is bypassed and the process gas flows directly toward reactor 34. This configuration is depicted in FIG. 4. Thus, reactor 34 is permitted to operate under higher-temperature Claus conditions while reactors 26 and 30 operate under cold bed adsorption conditions. Further, during this period of operation, the catalyst within reactor 34 is regenerated so as to vaporize sulfur that has accumulated thereon. In certain embodiments, this particular plant configuration is operated for a period of approximately 9 hours.

Subsequent to operating plant 10 according to the configuration shown in FIG. 4, operation of plant 10 is reverted to the configuration shown in FIG. 3. Namely, condenser 32 is brought back on-line so that process gas from primary Claus reactor 12 now flows through condenser 32 en route to reactor 34. This transition begins cooling of the catalyst in reactor 34 in preparation for the next re-sequencing of reactor units. In certain embodiments, the process gas exiting condenser 32 has a temperature of approximately 260° F., and plant 10 is operated in this configuration for approximately 3 hours.

Figure 5:
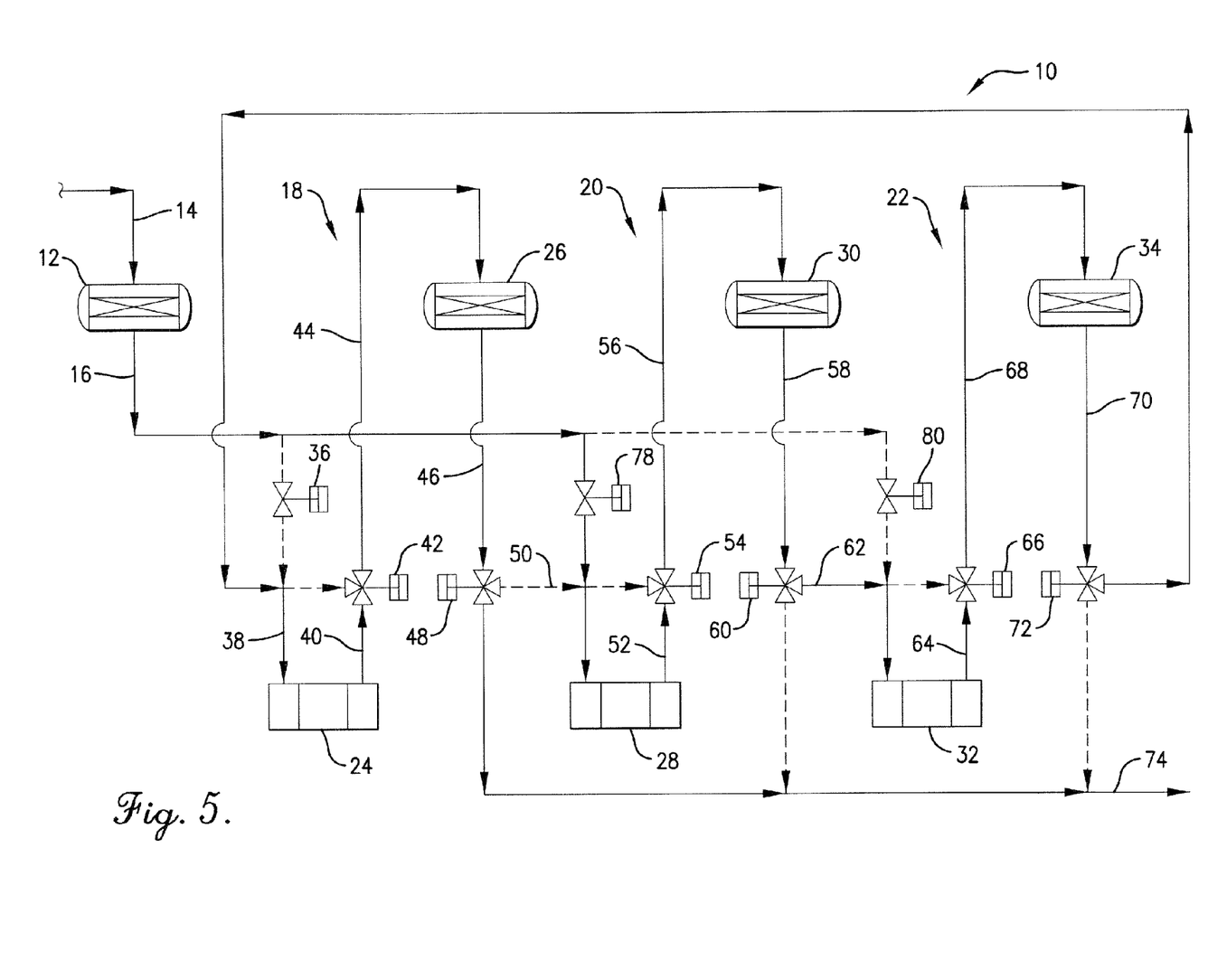
FIG. 5 is a process flow diagram of a sulfur removal plant in which process gas exiting the primary Claus reactor is initially directed toward a second CBA reactor unit, and particularly through the condenser of the second unit prior to being directed into the reactor of the second unit, and wherein the first reactor unit from FIGS. 1 and 2 is now in the final position in the series of reactor units.

As shown in FIG. 5, the sequencing of the reactor units is changed yet again. Reactor unit 20 assumes the first position, followed by reactor units 22 and 18. In this configuration, the catalyst in reactor 26 is the coolest of all of the three reactor unit reactors and thus capable of most efficient operation under cold bed adsorption conditions. Valve 36 and 80 are now closed, while valve 78 has been opened so that process gas exiting primary Claus reactor 12 via conduit 16 is directed toward reactor unit 20. Three-way valve 54 is positioned to that the process gas flows through condenser 28. Process gas exits condenser 28 and is carried via conduit 52, through three-way valve 54 and toward reactor 30 via conduit 56. In certain embodiments, the process gas exiting condenser 52 has a temperature of approximately 260° F.

The process gas carried by conduit 58 is then directed toward reactor unit 22 through three-way valve 60. The process gas flows through condenser 32, exiting the condenser at approximately 260° F. in certain embodiments, and then onto reactor 34. The process gas carried by conduit 70 is then directed toward reactor unit 18 by three-way valve 72. The process gas flows through condenser 24 which is operated at or below the freezing point of sulfur. In certain embodiments, the process gas exiting condenser 24 via conduit 40 has a temperature of about 240° F. or less, thereby leading to a reactor 26 inlet temperature that is within 10° F. of the freezing point of sulfur. The process gas is then directed toward reactor 26 which operates under cold bed adsorption conditions. The process gas exits reactor 26 via conduit 46 and is directed toward conduit 74 by valve 48 and ultimately to the incinerator. In certain embodiments, plant 10 operates in this configuration for approximately 3 hours.

Figure 6:
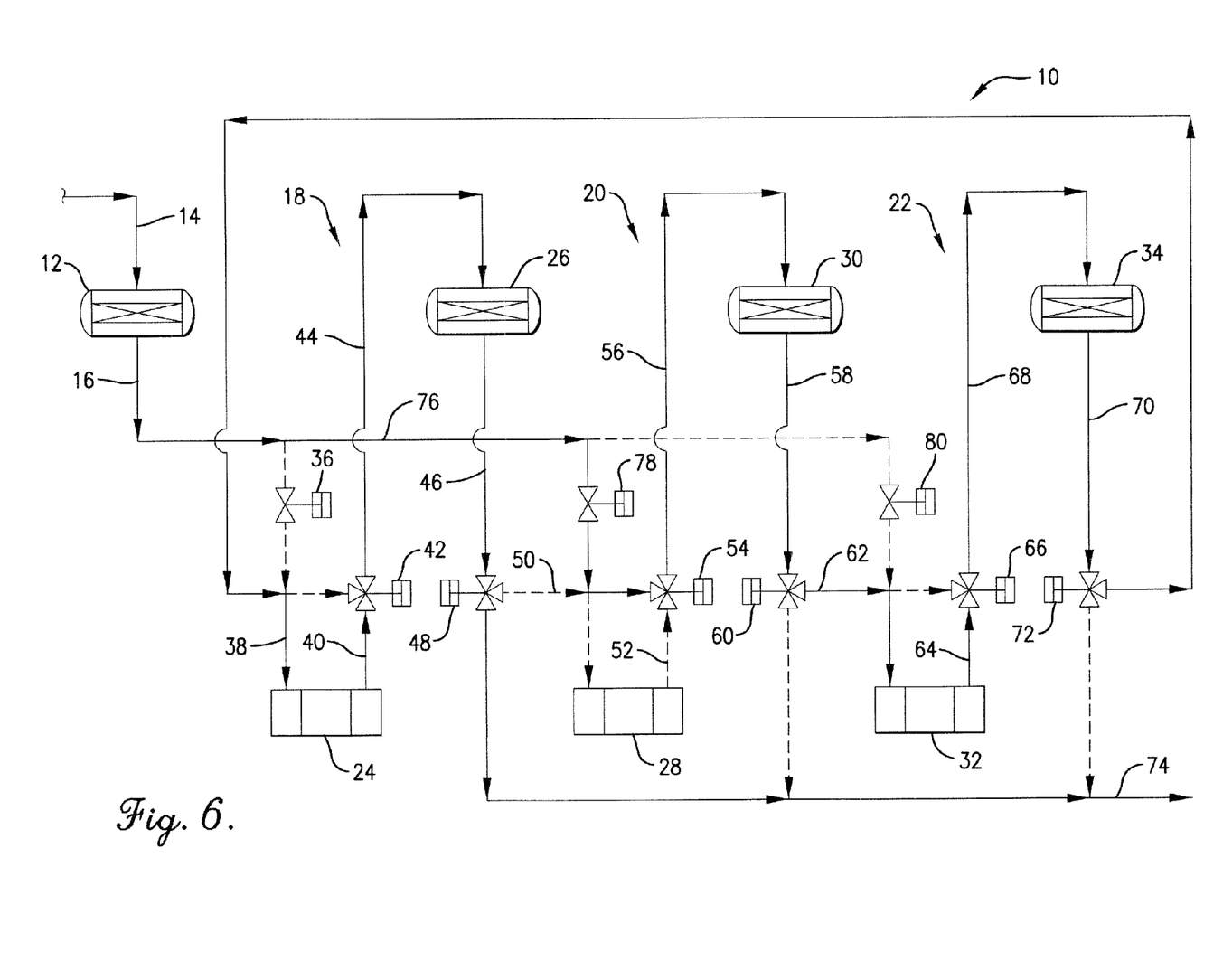
FIG. 6 is a process flow diagram of a sulfur removal plant as depicted in FIG. 5, except that the process gas exiting the primary Claus reactor bypasses the condenser of the second unit and is directed immediately into the reactor of the second unit.

Next, the configuration of plant 10 is slightly altered so that reactor 30 is operated under Claus conditions and the catalyst contained therein is regenerated. As shown in FIG. 6, the position of valve 54 is changed so as to cause the process gas from conduit 76 to bypass condenser 28. In this manner, process gas from primary Claus reactor 12 is directly fed to reactor 30 without having undergone sulfur condensation. The remainder of the process remains essentially the same as depicted in FIG. 5 and described previously. In certain embodiments, plant 10 operates in this configuration for approximately 9 hours.

Following a period of operation of plant 10 in the configuration shown in FIG. 6, the configuration of plant 10 is reverted to that shown in FIG. 5 in preparation of a change in reactor unit sequencing. In certain embodiments, this period of operation in the configuration shown in FIG. 5 is for approximately 3 hours.

At this stage, reactor units 18, 20, and 22 have completed a full cycle with respect to their sequencing order within plant 10. Plant 10 continues to operate in this fashion with periodic re-sequencing of reactor units. As discussed above, during a change in reactor unit sequencing, the reactor unit immediately downstream from primary Claus reactor 12 is shifted to the second position. The reactor unit furthest downstream from primary Claus reactor 12 is shifted into the first position to be immediately downstream from reactor 12. By following this sequencing of reactor units, it is ensured that the reactor having the coolest catalyst is last in the sequence and is capable of operating most efficiently under cold bed adsorption conditions.

I claim:

1. A process for recovering sulfur from a gas stream comprising:
    passing a process gas comprising $H_2S$ and $SO_2$ through a primary Claus reactor operable to convert at least a portion of the $H_2S$ and $SO_2$ present in the process gas into elemental sulfur;
    sequentially passing the gas exiting the primary Claus reactor through at least first, second, and third reactor units, each reactor unit comprising a catalytic reactor and a sulfur condenser, each of the catalytic reactors being capable of selective operation under both Claus reaction conditions and cold bed adsorption conditions, during a first period of operation the reactor of the third reactor unit operates under cold bed adsorption conditions; and
    after the first period of operation of the reactor units, rearranging the sequence of the reactor units such that during a second period of operation the gas exiting the primary Claus reactor first passes through the third reactor unit, followed by the first and second reactor units, during at least a portion of said second period of operation the gas exiting the primary Claus reactor bypasses the condenser of the third reactor unit so that the reactor of the third reactor unit is operated under high temperature Claus reaction conditions, and the reactor of the second reactor unit is operated under cold bed adsorption conditions.

2. The process according to claim 1, wherein during the first period of operation the first reactor unit undergoes regeneration in which elemental sulfur deposited on the catalyst present in the catalytic reactor is liberated therefrom.

3. The process according to claim 2, wherein during regeneration of the first reactor unit, the gas exiting the primary Claus reactor bypasses the condenser of the first catalytic reactor unit and is directed into the catalytic reactor of the first reactor unit.

4. The process according to claim 3, wherein after having bypassed the condenser of the first catalytic reactor unit for a length of time, the gas exiting the primary Claus reactor is directed through the condenser of the first catalytic reactor unit prior to entering the catalytic reactor of the first reactor unit thereby resulting in at least partial cooling of the catalyst contained in the catalytic reactor of the first reactor unit.

5. The process according to claim 1, wherein during the first period of operation, the gas exiting the condenser of the third reactor unit is at or below the freezing point of sulfur.

6. The process according to claim 1, wherein during the first period of operation, the catalytic reactor of the third reactor unit in the series has an inlet temperature that is within 10° F. of the freezing point of sulfur.

7. The process according to claim 1, wherein during the second period of operation, the gas exiting the condenser of the second reactor unit is at or below the freezing point of sulfur.

8. The process according to claim 1, wherein during the second period of operation, the catalytic reactor of the second reactor unit has an inlet temperature that is within 10° F. of the freezing point of sulfur.

9. The process according to claim 1, wherein after the second period of operation of the reactor units, the sequence of the reactor units is rearranged again such that the gas exiting the primary Claus reactor first passes through the second reactor unit followed by the third and first reactor units and the reactor units operated for a third period of operation.

10. The process according to claim 9, wherein during the third period of operation, the gas exiting the condenser of the first reactor unit is at or below the freezing point of sulfur.

11. The process according to claim 9, wherein during the third period of operation, the catalytic reactor of the first reactor unit has an inlet temperature that is within 10° F. of the freezing point of sulfur.

12. The process according to claim 9, wherein after the third period of operation, the sequence of the reactor units is rearranged again such that the gas exiting the primary Claus reactor is directed through the reactor units in the same sequence as during the first period of operation.

13. A process for recovering sulfur from a gas stream comprising:
    passing a process gas comprising $H_2S$ and $SO_2$ through a primary Claus reactor operable to convert at least a portion of the $H_2S$ and $SO_2$ present in the process gas into elemental sulfur; and sequentially passing the gas exiting the primary Claus reactor through a series of reactor units, each reactor unit comprising a catalytic reactor and a sulfur condenser located upstream of the reactor, each of the catalytic reactors being capable of selective operation under both Claus reaction conditions and cold bed adsorption conditions, wherein the condenser of the final reactor unit in the series is operated so that the gas exiting said condenser and being directed toward the reactor of the final reactor unit in the series is at or below the freezing point of sulfur.

14. The process according to claim 13, wherein said series of reactor units comprises at least three reactor units.

15. The process according to claim 13, wherein the sulfur condenser of each reactor unit is a tube/shell condenser, the temperature of the sulfur condenser of the final reactor unit in the series being controlled by reducing the pressure of steam present in the shell side of the condenser relative to the pressure of steam present in the shell side of the other sulfur condensers.

16. A process for recovering sulfur from a gas stream comprising:

passing a process gas comprising $H_2S$ and $SO_2$ through a primary Claus reactor operable to convert at least a portion of the $H_2S$ and $SO_2$ present in the process gas into elemental sulfur; and sequentially passing the gas exiting the primary Claus reactor through a series of reactor units, each reactor unit comprising a catalytic reactor and a sulfur condenser, each of the catalytic reactors being capable of selective operation under both Claus reaction conditions and cold bed adsorption conditions, wherein the catalytic reactor of the final reactor unit in the series has an inlet temperature that is within 5° F. of the freezing point of sulfur.

17. The process according to claim 16, wherein said series of reactor units comprises at first, second, and third reactor units, after a first period of operation of the reactor units in which the third reactor unit comprises the final reactor unit in the series, the sequence of the reactor units is rearranged such that during a second period of operation the gas exiting the primary Claus reactor first passes through the third reactor unit, followed by the first and second reactor units, and wherein the catalytic reactor of the second reactor unit has an inlet temperature that is within 5° F. of the freezing point of sulfur.

* * * * *